United States Patent
Ozozlu et al.

(10) Patent No.: US 12,231,226 B2
(45) Date of Patent: Feb. 18, 2025

(54) POLARIZATION DIVISION MULTIPLE ACCESS

(71) Applicant: T-MOBILE INNOVATIONS LLC, Overland Park, KS (US)

(72) Inventors: Akin Ozozlu, McLean, VA (US); Nagi A. Mansour, Arlington, VA (US)

(73) Assignee: T-MOBILE INNOVATIONS, Overland Park, KS (US)

( * ) Notice: Subject to any disclaimer, the term of this patent is extended or adjusted under 35 U.S.C. 154(b) by 444 days.

(21) Appl. No.: 17/566,906

(22) Filed: Dec. 31, 2021

(65) Prior Publication Data

US 2023/0216599 A1 Jul. 6, 2023

(51) Int. Cl.
*H04J 11/00* (2006.01)
*H01Q 21/24* (2006.01)

(52) U.S. Cl.
CPC ............ *H04J 11/00* (2013.01); *H01Q 21/24* (2013.01)

(58) Field of Classification Search
CPC .... H04B 7/10; H04B 7/1555; H04B 7/15571; H04B 7/02; H04B 14/008; H01Q 21/245; H01Q 15/24; H04W 72/046; H04L 5/04; H04J 14/06; H04J 11/00
See application file for complete search history.

(56) References Cited

U.S. PATENT DOCUMENTS

| | | | | |
|---|---|---|---|---|
| 8,594,732 | B2 * | 11/2013 | Laroia | H04W 16/02 343/893 |
| 9,917,363 | B1 * | 3/2018 | Gauba | H01Q 21/24 |
| 2009/0227260 | A1 * | 9/2009 | Anreddy | H04B 7/10 455/562.1 |

FOREIGN PATENT DOCUMENTS

WO WO-2022058009 A1 * 3/2022 ............ H01Q 1/246

OTHER PUBLICATIONS

Kamal, Shahanawaz et al., "Wheel-shaped miniature assembly of circularly polarized wideband microstrip antenna for 5G mmWave terminals", Alexandria Engineering Journal, vol. 60, Issue 2, 2021, pp. 2457-2470, https://www.sciencedirect.com/science/article/pii/S111001682030702X.

Pang, Jian et al., "A 28-GHz CMOS Phased-Array Beamformer Utilizing Neutralized Bi-Directional Technique Supporting Dual-Polarized MIMO for 5G NR," in IEEE Journal of Solid-State Circuits, vol. 55, No. 9, pp. 2371-2386, Sep. 2020, https://ieeexplore.ieee.org/document/9102243.

Ramalingam, Manoharan, "Polarization MIMO—a secret sauce of mmWave based 5G Systems (Part—1)", Linked in, Dec. 5, 2020, https://www.linkedin.com/pulse/polarization-mimo-secret-sauce-mmwave-based-5g-manoharan-ramalingam/.

* cited by examiner

*Primary Examiner* — Chi H Pham
*Assistant Examiner* — Samuel Dilan Rutnam
(74) *Attorney, Agent, or Firm* — SHOOK, HARDY & BACON L.L.P.

(57) ABSTRACT

Embodiments of the present disclosure are directed to systems and methods for polarization division multiple access. A polarized antenna system having a plurality of differently-polarized antennas is envisioned for wirelessly communicating with a plurality of user devices in a wireless network environment. Each polarized pair of antenna elements, using a particular frequency, will transmit signals using a polarization-frequency pair and a base station will instruct user devices which polarization-frequency pair they should tune to for processing the appropriate downlink signal. Using OFDMA with a polarized antenna system increases capacity without the need for deploying additional base stations.

18 Claims, 4 Drawing Sheets

POLARIZATION DIVISION MULTIPLE ACCESS

SUMMARY

The present disclosure is directed to an improved polarization division multiple access system, substantially as shown and/or described in connection with at least one of the Figures, and as set forth more completely in the claims.

According to various aspects of the technology, signals may be transmitted by an antenna system having a plurality of different polarized pairs in order to increase overall throughput of the system. As the number of UEs increase globally and with a limited amount of RF spectrum being available to communicate with them, wireless telecommunication network operators must find solutions to increase load without increasing spectrum. One solution being explored is a shifting reliance on higher frequency bands; with reduced range and greater throughput, the network operator can simply deploy more base stations to serve the increase density of devices. However, deploying new base stations is a costly endeavor in terms of both up-front and recurring costs. By using an antenna system with numerous polarizations, a base station can communicate with a greater number of devices simultaneously, without additional spectrum demands.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
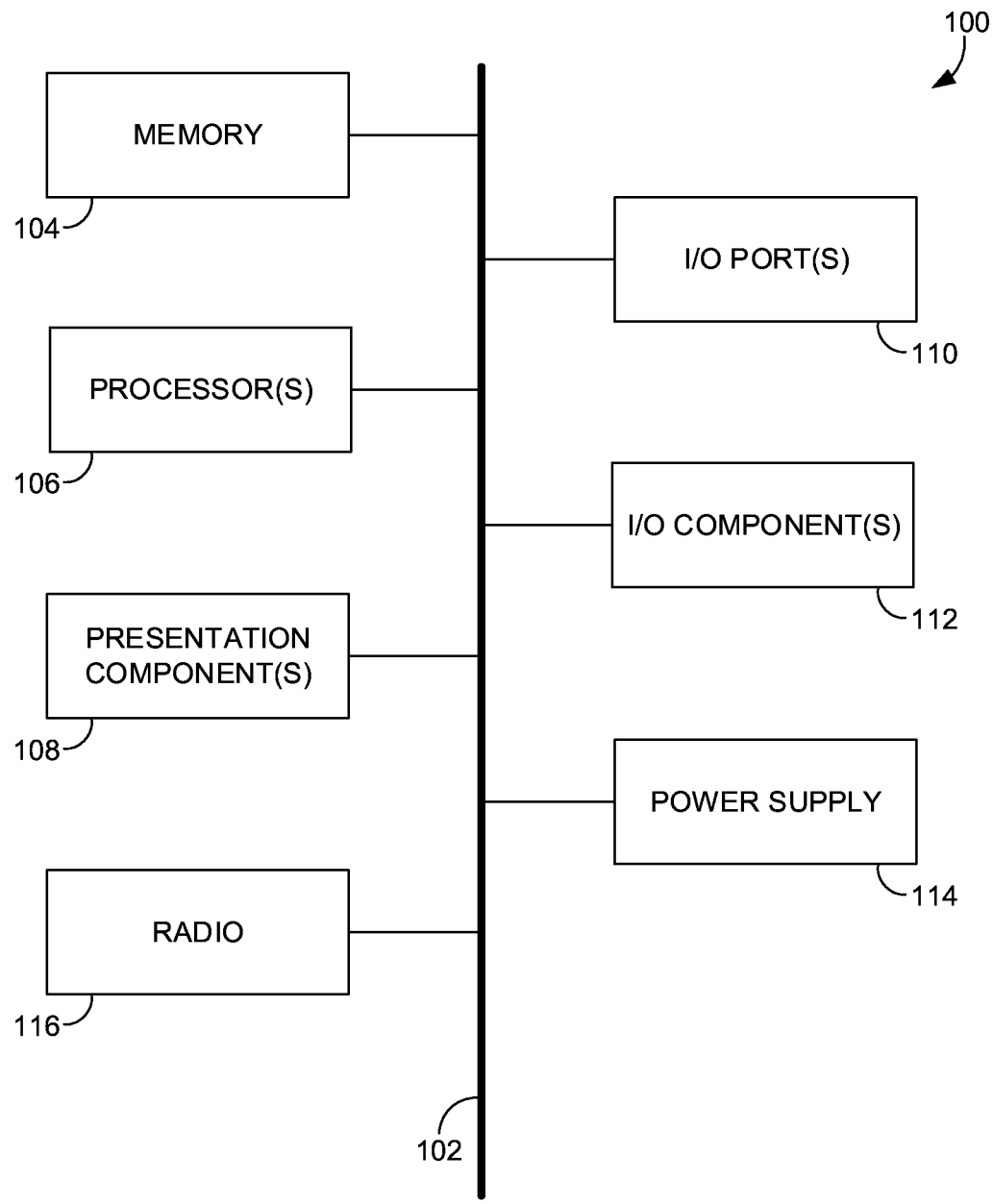
FIG. 1 illustrates an exemplary computing device for use with the present disclosure.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense in the telecommunication arts as one skilled in the art would readily comprehend. Further, various technical terms are used throughout this description. An illustrative resource that fleshes out various aspects of these terms can be found in Newton's Telecom Dictionary, 31st Edition (2018). As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 802.11x, and the like. The term "operator" is used to refer to an entity (e.g., a corporation) that provides networked connectivity to one or more UEs; examples of operators include wireless telecommunication carriers such as T-Mobile, AT&T, Verizon, and the like. The term "base station" is used in its generic and literal sense and refers to any terrestrial radio station that transmits and/or receives signals to/from one or more destinations (e.g., UEs); a macro cell, small cell, and femto cell are all considered a base station for the purpose of the present disclosure. Certain signal processing techniques that are known in the art are referred to by their acronyms, such as time division multiple access (TDMA), frequency division multiple access (FDMA), orthogonal frequency division multiple access (OFDMA), and code division multiple access (CDMA).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media. Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media. Implementations of the present disclosure may be described in the general context of computer code or machine-useable instructions, including computer-executable instructions such as program components, being executed by a computer or other computer processing component. Generally, program components, including routines, programs, objects, components, data structures, and the like, refer to code that performs particular tasks or implements particular abstract data types. Implementations of the present disclosure may also be practiced in distributed computing environments where tasks are performed by remote-processing devices that are linked through a communications network.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, network operators have been, and continue to be, faced with a critical issue in the provision of wireless telecommunication service—how to serve increasingly large numbers of UEs with a high degree of service without necessitating the use of greater amounts of RF spectrum. In many, if not all jurisdictions, RF spectrum is highly regulated so that RF transmissions don't overlap or interfere with one another. Spectrum (re-)allocation is often times extremely expensive and is rare. In other words, wireless network operators must use the spectrum they already have to serve increasingly large numbers and/or greater densities of UEs. In the past, network operators have developed multiple access technologies in order to increase the number of UEs that can be served by a single base station within a single frequency band; for example, TDMA, FDMA, OFDMA, and CDMA have been used in various generations of network access technologies. Polarization division multiple access has traditionally not been utilized in terrestrial telecommunications. Known polarization division multiplexing (PDM) or polarization division multiple access (PDMA) practices involve extraterrestrial base stations (i.e., satellites) that transmit signals on a common frequency in both a horizontal plane and a vertical plane, using two pairs of elements spaced 90 degrees apart. Because modern communication systems that utilize polarization diversity need to ensure orthogonal integrity, it is not known that antenna systems can have greater than two polarizations.

In order to solve this problem, the present disclosure is directed to systems, methods, and computer readable media for polarized antenna systems that can be implemented to practice polarization division multiple access and/or to provide redundant antenna arrays for base stations. A single antenna array or antenna system comprises a plurality of polarized antennas, each antenna having a different polarity. Each polarized antenna can be used to communicate with a plurality of user devices within a single coverage area, increasing the capacity of a base station compared to conventional single polarity antenna systems. Though some conventional base stations utilize polarization division multiplexing to communicate with a single UE on two different and orthogonal waveforms, the present disclosure permits the use of polarization multiplexed signals (or single polarity signals) to be sent to different pluralities of user devices, using different polarization-frequencies. The polarization division multiple access scheme may use OFDMA to permit transmitting downlink signals to a first plurality of user devices on the same frequency as a second plurality of user devices, but using different polarities. A chipping code may also be used to further increase the integrity of the system in order that each plurality of user devices is processing the appropriate set of downlink signals. Further, the polarized antenna system can be deployed with numerous (e.g., 8) differently polarized antennas, enabling some of the antennas to be held inactive and activated if a service degradation is determined to have occurred, wherein one or more of the previously active antennas is deactivated.

Accordingly, a first aspect of the present disclosure is directed to a system for multiple access in a wireless network environment comprising a polarized antenna system comprising a plurality of antennas, each antenna of the plurality of antennas having a discrete polarization. The system further comprises one or more computer processing components communicatively coupled to the polarized antenna system and configured to perform a method comprising transmitting a first set of downlink signals to a first plurality of user devices in a coverage area using a first antenna of the plurality of antennas, the first antenna having a first polarity. The method further comprises transmitting a second set of downlink signals to a second plurality of user devices in the coverage area using a second antenna of the plurality of antennas, the second antenna having a second polarity.

A second aspect of the present disclosure is directed to a method for polarization division multiple access comprising one or more computer components configured to perform a method comprising transmitting a first set of downlink signals to a first plurality of user devices in a coverage area using a first antenna of an antenna array, the first antenna having a first polarity. The method further comprises transmitting a second set of downlink signals to a second plurality of user devices in the coverage area using a second antenna of the antenna array, the second antenna having a second polarity.

According to another aspect of the technology described herein, a polarized antenna system is provided, comprising a polarized antenna array comprising a first set of polarized antennas and a second set of polarized antennas, each antenna of the first set of polarized antennas and the second set of polarized antennas having a different polarity, wherein the second set of polarized antennas is inactive during a first time period. The system further comprises one or more computer processing components communicatively coupled to the polarized antenna array and configured to perform a method comprising using a first antenna of the first set of polarized antenna to communicate with a first plurality of user devices in a coverage area during the first time period. The method further comprises using a second antenna of the first set of polarized antennas to communicate with a second plurality of user devices in a the coverage area during the first time period. The method further comprises determining that at least one of the first plurality of user devices and the second plurality of user devices is experiencing a service degradation during the first time period. The method further comprises deactivating at least one antenna of the first set of polarized antennas and activating at least one antenna of the second set of polarized antennas in a second time period, the second time period subsequent to the first time period.

Referring to FIG. 1, a diagram is depicted of an exemplary computing environment suitable for use with implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include equipment types identified by the GSMA, including mobile/feature phones, smart phones, tablets, IoT devices, wearable devices, dongles, modems, and WLAN routers, each of which may have any one or more components depicted in FIG. 1.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. In aspects, the radio 116 utilizes one or more transmitters, receivers, and antennas to communicate with the wireless telecommunications network on a first downlink/uplink channel. Though only one radio is depicted in FIG. 1, it is expressly conceived that the computing device 100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
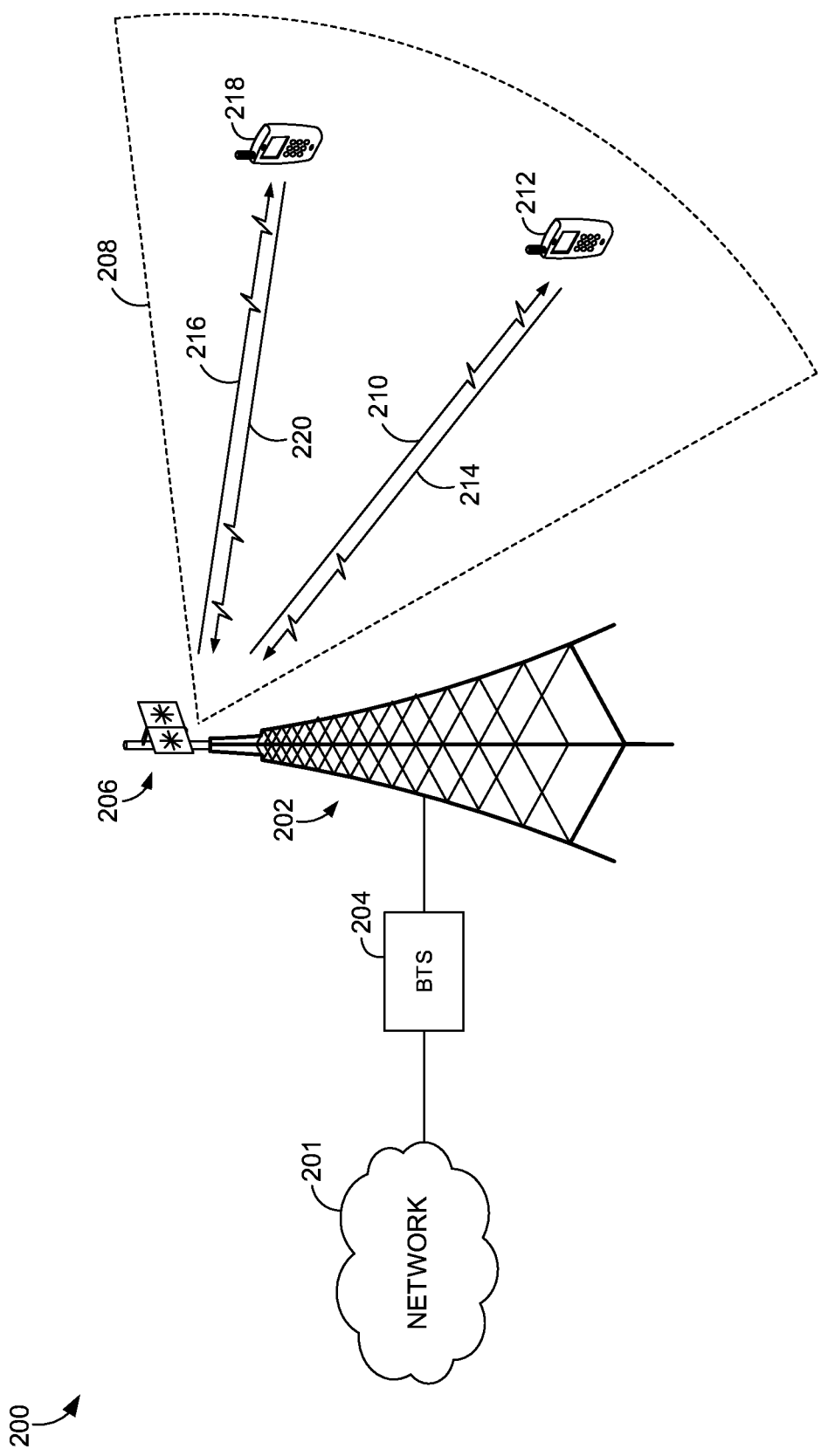
FIG. 2 illustrates a diagram of an exemplary network environment in which implementations of the present disclosure may be employed.

Turning now to FIG. 2, an exemplary network environment is illustrated in which implementations of the present disclosure may be employed. Such a network environment is illustrated and designated generally as network environment 200. At a high level, the network environment 200 may be said to comprise a cell site 202 having a base transceiver station 204 that is communicatively coupled to a polarized antenna system 206, which generally operates to wirelessly connect a plurality of UEs in a particular coverage area 208 to a network 201. Though illustrated as a terrestrial macro site, the cell site 202 may take any desirable form, including a small cell, femto cell, or the like, and may be extraterrestrial (e.g., a satellite or airborne station). The base transceiver station 204 may also take any one of many forms, including an eNodeB, gNodeB, or any other equipment that is generally configured to process, transmit, and receive wireless signals. The network 201 may be a data network, core telecommunication network (e.g., EPS core or 5G core), PTSN, or any other destination remote to the cell site 202 that is sought by any one or more of the UEs served by the cell site 202. As will be described in greater detail, the base transceiver station 204 generally utilizes the polarized antenna system 206 to wireles sly communicate with one or more UEs located in the coverage area 208 served by the cell site 202. For example, the base transceiver station 204 may transmit a first set of downlink signals 210 to a first UE 212 (which may be either a single device or represent a first plurality of UEs) and receive a first set of uplink signals 214 from the first UE 212, and may transmit a second set of downlink signals 216 to a second UE 218 and receive a second set of uplink signals 220 from the second UE 218 (which may be either a single device or represent a second plurality of UEs).

Figure 3:
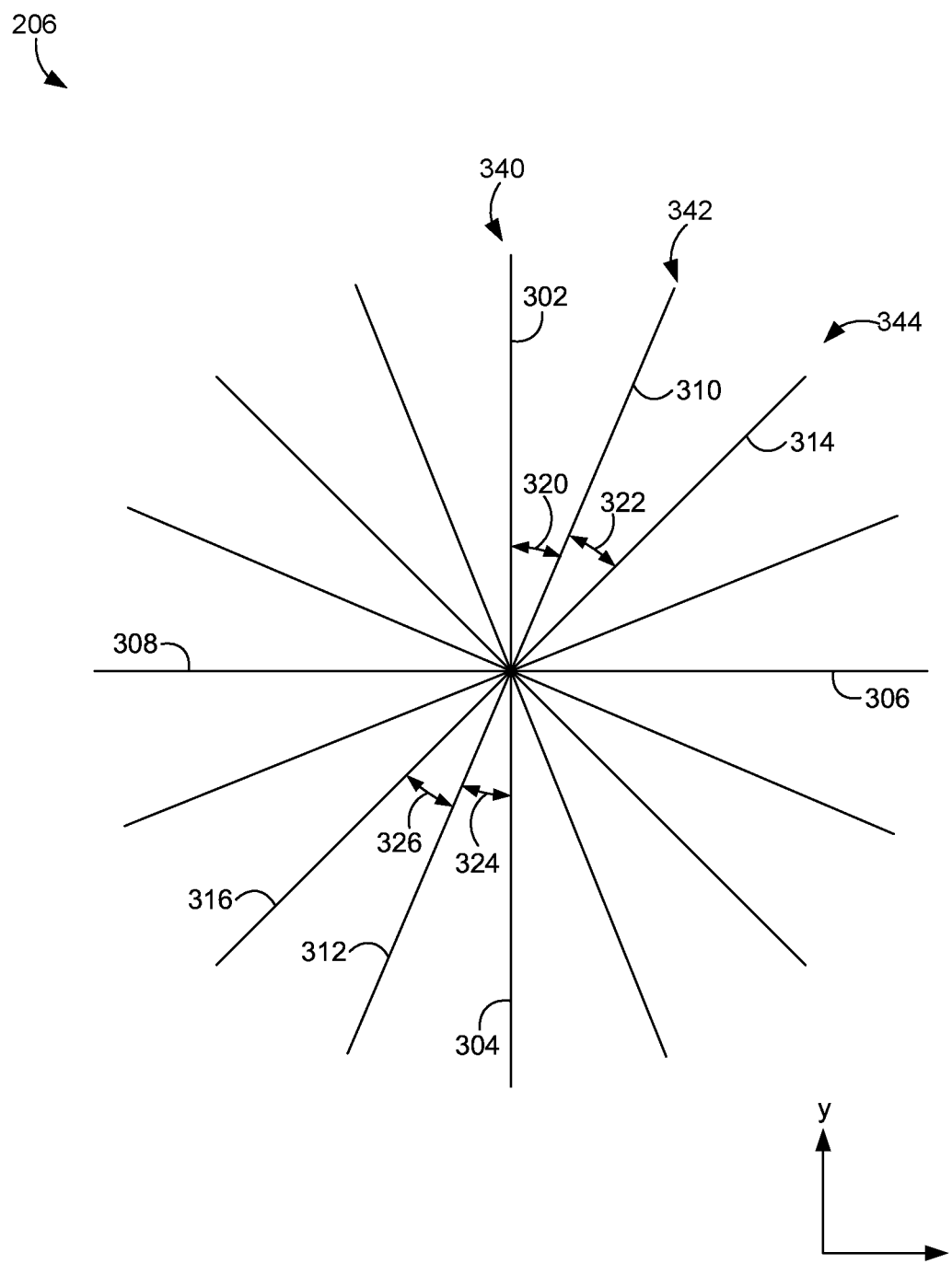
FIG. 3 illustrates a diagram of one embodiment of a polarized antenna system that may be employed to practice the present disclosure.

Turning now to FIG. 3, the polarized antenna system 206 is shown in greater detail. In its most generalized form, the polarized antenna system 206 comprises three or more pairs of polarized antenna elements. The illustrated embodiment of FIG. 3 shows eight pairs of polarized antenna elements; however, it is expressly conceived that the inventive solution of the present disclosure could be implemented with as few as three pairs of polarized elements and could be more than eight pairs. The polarized antenna system 206 comprises three or more pairs of polarized antenna elements, wherein each pair of polarized elements is generally collinear (i.e., 180 degrees offsets the two elements of each pair of polarized elements). That is, a first pair of polarized elements may comprise element 302 and element 304; a second pair of polarized elements may comprise element 310 and element 312; a third pair of polarized elements may comprise element 314 and 316, and so on. Though illustrated as a series of radial dipole antennas, the polarized antenna system 206 may take any desirable form, Between each pair of adjacent polarized elements exists an inter-polarization angle (for the purposes of FIG. 3, adjacent is used in the sense that two antenna elements are next to each other as the polarized antenna system 206 is examined clockwise/counterclockwise). Because each pair of polarized elements is collinear, a first inter-polarization angle 320 between a first pair of polarized elements 340 and a second pair of polarized elements 342 is the same as a third inter-polarization angle 324. A second inter-polarization angle 322 may be said to exist between the second pair of polarized elements 342 and a third pair of polarized elements 344, and which may be the same as the fourth inter-polarization angle 326.

The polarized antenna system 206 has three or more pairs of polarized elements. In one aspect, the inter-polarization angles between each subsequent pair of polarized elements may be equal; for example, if the polarized antenna system 206 comprises 8 pairs of polarized elements, the first inter-polarization angle 320, the second inter-polarization angle 322, the third inter-polarization angle 324, and the fourth inter-polarization angle 326 may be equal (there being 16 elements (8 pairs), this equal angle would be 22.5 degrees). In another aspect, the inter-polarization angles may not be equal between subsequent pairs of polarized elements; for example the first inter-polarization angle 320 may be more or less than the second inter-polarization angle 322. Though shown as having the first pair of polarized elements in the y-axis and a horizontal pair of elements 306, 308 in the x-axis, it should be understood that, because of the possibilities of the number of polarized pairs and inter-polarization angles, there may not be any elements in the y-axis and/or the x-axis; further, the entire polarized antenna system 206 maybe be slanted/offset such that elements that would have otherwise been in the y-axis and the x-axis are offset from said axes.

Returning to FIG. 2, the polarized antenna system 206 may be utilized to simultaneously transmit multiple sets of downlink signals to multiple destinations. Remaining with the illustrated embodiment of FIG. 3 having eight pairs of polarized elements, the polarized antenna system 206 may be fed with signals from the base transceiver station 204 of FIG. 2 to transmit the first set of downlink signals 210 from the first pair of polarized elements 340 and to transmit the second set of downlink signals 216 from the second pair of polarized elements 342. Every transmission from each pair of polarized elements may be said to have a unique polarization-frequency, whether solely based on different polarizations or based on different polarizations and frequencies. In a first aspect, each pair of polarized elements of the polarized antenna system 206 may utilize a different frequency (channel, band, etc.). In a second aspect, each pair of polarized elements of the polarized antenna system 206 may utilize a common frequency. In a third aspect, a first set of two or more pairs of polarized elements may utilize a first frequency and a second set of two or more pairs of polarized elements may utilize a second frequency; in such an aspect, each set of two or more pairs of polarized elements may be orthogonal (for example, with respect to FIG. 3, a pair of elements in the y-axis are orthogonal to a pair of elements in the x-axis and may utilize the same frequency with no other polarities). Regardless of the particular implementation, a polarization-frequency instruction may be provided to the first UE 212 by the base transceiver station 204 to tune to a first polarity-frequency that equates to the first pair of polarized elements 340 and the second UE 218 may be instructed by the base transceiver station 204 to tune to a second polarity-frequency that equates to the second pair of polarized elements 342. Inasmuch that multiple UEs are able to rely on downlink signals from differently-polarized pairs of polarized elements, the present disclosure is directed to polarization division multiple access.

In aspects where a greater number of UEs are present within the coverage area 208, the base transceiver station 204 may utilize a combination of PDMA and OFDMA in order to significantly increase the number of devices that could be served. In such an aspect, each pair of polarized elements may transmit downlink signals according to conventional OFDMA techniques; therefore, if a conventional antenna could utilize OFDMA to communicate with N number of UEs in the downlink, and if the polarized antenna system 206 comprise eight polarized pairs of elements, the polarized antenna system 206 could utilize a PDMA-OFDMA approach to communicate with 8N number of UEs. In another aspect, the base transceiver station 204 may utilize CDMA by encoding downlink signals with a chipping code in addition to PDMA (whether OFDMA is utilized or not) to provide an indication to a receiving UE which signal is associated with a particular polarity-frequency. That is, a first chipping code may be utilized on a first polarity-frequency and communicated to the first UE 212 so that if the first UE 212 also receives the second downlink signal 216 having a second polarity-frequency and encoded by a second chipping code, it can use the first chipping code to decode the appropriate signal (the first downlink signal 210). Further, a single code could be used for a single UE to receive signals from two different polarization-frequencies; for example, if a vertical (0 degrees) pair of polarized elements and horizontal (90 degrees) pair of polarized elements (which are orthogonal at transmission) are used to communicate to the first UE 212, the first UE 212 can use the first code to decode and process both signals, even if they are not orthogonal at the point of reception.

The polarized antenna system 206 may not utilize all of its elements at all times. If the polarized antenna system 206 is said to have N number of polarized pairs (e.g., 3, 4, 6, 8, etc.), one or more of the pairs of polarized elements may be active and one or more pairs may be inactive. Using an example where the polarized antenna system 206 comprises 8 pairs of polarized elements (as illustrated in FIG. 3), every other pair of polarized elements may be used for transmitting downlink signals (e.g., the first pair of polarized elements 340 and the third pair of polarized elements 344 are transmitting and the second pair of polarized elements 342 is inactive). If it is determined that a channel condition exceeds a predetermined threshold, the polarized antenna system 206 may deactivate one or more pairs of polarized elements that were active and activate one or more pairs of polarized elements that were inactive. For example, if it is determined that the air interface is excessively noisy, the polarized antenna system may deactivate some pair of polarized elements to reduce the overall number of polarity-frequencies that are being utilized in a particular coverage area (reducing noise). In another example, if RSRQ, RSSI, and/or SINR is determined to exceed a predetermined threshold, the active pairs of polarized elements may invert (e.g., if the first and third pairs of polarized elements 340,344 were active and the second pair of polarized elements 342 was inactive, then the first and third pairs of polarized elements 340,344 may be deactivated and the second pair of polarized elements 342 may be activated. In a related aspect, pairs of polarized elements may be activated/deactivated based on a determination that one or more antenna elements of the polarized antenna system 206 are faulty. For example, if one or more 'even' pairs of polarized elements are determined to be faulty, the faulty pair (or all the even pairs) may be deactivated and one (or all) of the 'odd' pairs of polarized elements may be activated.

Figure 4:
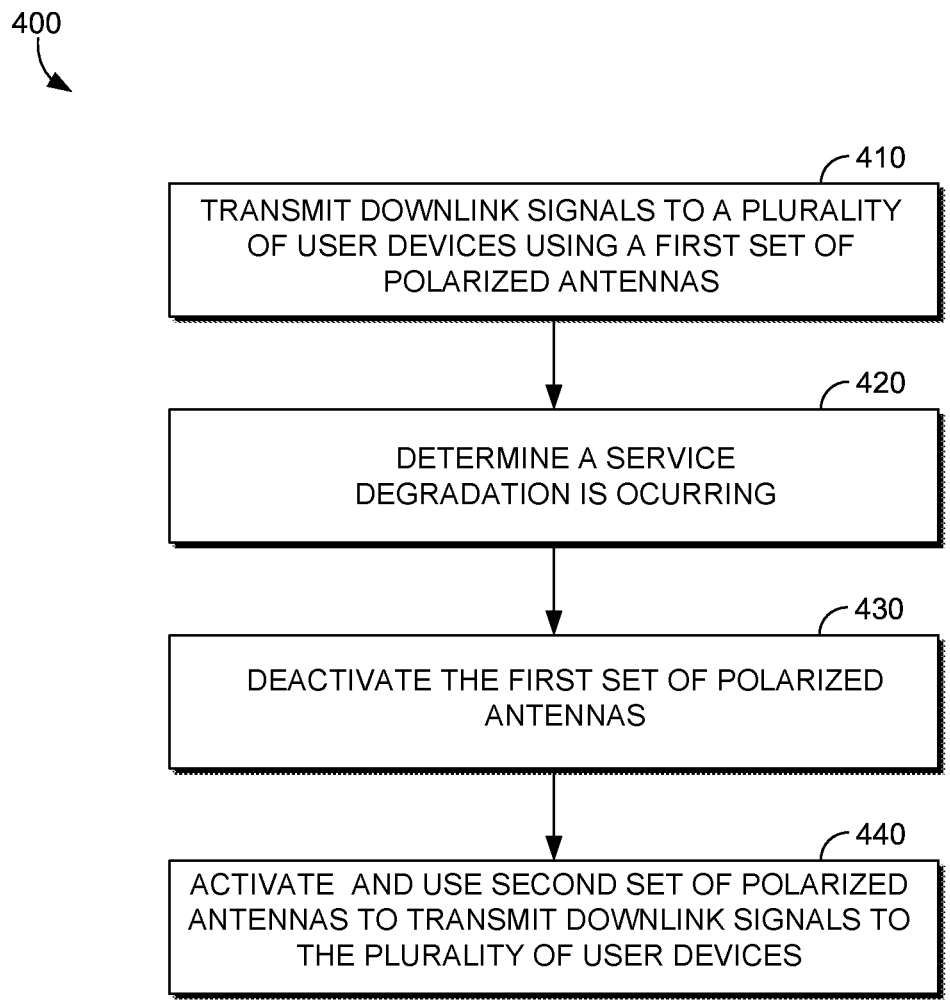
FIG. 4 depicts a flow diagram of an exemplary method for using a polarized antenna system, in accordance with embodiments described herein.

Turning now to FIG. 4, a flow chart is provided that illustrates one or more aspects of the present disclosure relating to a method 400 for utilizing a polarized antenna system in a wireless network environment. At a first step 410 a first antenna of a first set of polarized antennas is used to communicate with a first plurality of user devices in a coverage area during a first time period and a second antenna of the first set of polarized antennas is used to communicate with a second plurality of user devices in the coverage area during the first time period, wherein a second set of polarized antennas is inactive during the first time period, according to any one or more of the aspects described with respect to FIGS. 2-3. At a second step 420, it is determined that at least one of the first plurality of user devices and the second plurality of user devices is experiencing a service degradation during the first time period. As described with respect to FIGS. 2-3, the service degradation may be based on an indication that at least one antenna of the first set of antennas is fault or may be based on an indication that a channel condition exceeds a predetermined threshold (e.g., threshold high noise, threshold low SINR, threshold low RSRQ, and/or any other network parameter desirable by the network operator). At a third step 430, at least one antenna of the first set of polarized antennas is deactivated. In aspects, if a particular antenna is determined to be faulty, only that antenna may be deactivated; in other aspects, whether a particular antenna can be identified as faulty (or if the service degradation is determined based a channel condition), all or some of the first set of antennas that are used to transmit downlink signals in the first time period may be deactivated. At a fourth step 440, at least one antenna of the second set of polarized antennas is activated and used to transmit downlink signals to the plurality of user devices in the coverage area in a second time period instead of the first set of antennas, the second time period subsequent to the first time period. In aspects, such as where only one antenna of the first set of antennas is deactivated and only one antenna of the second set of antennas is activated, the second set of antennas may comprise antennas of the first set of antennas; in other aspects, the first set of antennas and the second set of antennas have no antennas in common.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for multiple access in a wireless network environment comprising:
   a polarized antenna system comprising a plurality of antennas, each antenna of the plurality of antennas having a discrete polarization; and
   one or more computer processing components communicatively coupled to the polarized antenna system and configured to perform operations comprising:
   transmitting a first set of downlink signals using a first frequency and a first chipping code to a first plurality of user devices in a coverage area using a first antenna of the plurality of antennas, the first antenna having a first polarity;
   transmitting a second set of downlink signals using a second frequency to a second plurality of user devices in the coverage area using a second antenna of the plurality of antennas, the second antenna having a second polarity, wherein the first polarity is different than the second polarity and the first plurality of user devices is different than the second plurality of user devices; and
   transmitting a third set of downlink signals using the first frequency and a second chipping code to a third user device in the coverage area using a third antenna of the plurality of antennas, the third antenna having a third polarity, wherein the third polarity is different than each of the first polarity and the second polarity, the second chipping code being different than the first chipping code.

2. The system of claim 1, wherein the first set of downlink signals and the second set of downlink signals are transmitted on a common frequency.

3. The system of claim 2, wherein the first polarity is 90 degrees different than the second polarity.

4. The system of claim 3, wherein the first polarity is 22.5 degrees and the second polarity is 111.5 degrees.

5. The system of claim 1, wherein the polarized antenna system comprises 8 antennas.

6. The system of claim 5, wherein a first inter-polarization angle between the first antenna and the second antenna is equal to a second inter-polarization angle between the second antenna and a third antenna, the second antenna being adjacent to the first antenna and the third antenna being clockwise adjacent to the second antenna.

7. The system of claim 1, wherein the first set of downlink signals are transmitted at the same time as the second set of downlink signals.

8. The system of claim 1, wherein each of the first set of downlink signals and the second set of downlink signals is transmitted using orthogonal frequency division multiple access, and wherein the one or more computer processing components are configured to communicate the chipping code and a polarization-frequency tuning instruction to the first plurality of user devices.

9. The system of claim 1, wherein a first inter-polarization angle between the first antenna and the second antenna is different than a second inter-polarization angle between the second antenna and a third antenna, the second antenna being adjacent to the first antenna and the third antenna being clockwise adjacent to the second antenna.

10. The system of claim 1, wherein each antenna of the plurality of antennas transmits one or more downlink signals on a different frequency.

11. A method for polarization division multiple access comprising:
transmitting a first set of downlink signals to a first plurality of user devices in a coverage area using a first antenna of an antenna array during a first time period and a second time period, the first antenna having a first polarity;
transmitting a second set of downlink signals to a second plurality of user devices in the coverage area using a second antenna of the antenna array during a first time period and a second time period, the second antenna having a second polarity;
transmitting a third set of downlink signals to a third user device in the coverage area during the first time period; and
not transmitting the third set of downlink signals to the third user device in the coverage area during the second time period.

12. The method of claim 11, wherein the first set of downlink signals are transmitted on a first frequency and the second set of downlink signals are transmitted on a second frequency, the first frequency being different than the second frequency.

13. The method of claim 12, wherein the polarized antenna system comprises 8 antennas.

14. The method of claim 13, wherein each of the first set of downlink signals and the second set of downlink signals is transmitted using orthogonal frequency division multiple access, the first set of downlink signals being encoded with a first chipping code and the second set of downlink signals being encoded with a second chipping code, the first chipping code being different than the second chipping code, and wherein the one or more computer processing components are configured to communicate the chipping code and a polarization-frequency tuning instruction to the first plurality of user devices.

15. A polarized antenna system comprising:
a polarized antenna array comprising a plurality of polarized antennas, the plurality of polarized antennas comprising a first antenna, a second antenna, and a third antenna, wherein each of the first antenna, the second antenna, and the third antenna have a different polarity;
one or more computer processing components communicatively coupled to the polarized antenna array and configured to perform operations comprising:
using the first antenna to communicate with a first plurality of user devices in a coverage area during each of a first time period and a second time period;
using the second antenna to communicate with a second plurality of user devices in the coverage area during each of the first time period and the second time period;
using the third antenna to communicate with a third user device in the coverage area during the first time period;
determining that at least one of the first plurality of user devices and the second plurality of user devices is experiencing a service degradation during the first time period; and
deactivating the third antenna and using at least one of the first antenna and the second antenna to communicate with the third user device in the second time period, the second time period subsequent to the first time period.

16. The system of claim 15, wherein the service degradation is determined in response to an indication that at least one antenna of the first set of polarized antennas is faulty.

17. The system of claim 15, wherein the service degradation is determined in response to an indication that a channel condition of the coverage area exceeds a predetermined threshold.

18. The system of claim 1, wherein transmitting the second set of downlink signals and transmitting the third set of downlink signals is in response to determining that a number of UEs present within the coverage area is greater than a threshold.

* * * * *